US010014698B2

(12) United States Patent
Tsurumaru et al.

(10) Patent No.: US 10,014,698 B2
(45) Date of Patent: Jul. 3, 2018

(54) STORAGE BATTERY SYSTEM

(71) Applicant: TOSHIBA MITSUBISHI-ELECTRIC INDUSTRIAL SYSTEMS CORPORATION, Chou-ku (JP)

(72) Inventors: Daisuke Tsurumaru, Tokyo (JP); Masato Hanada, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 170 days.

(21) Appl. No.: 14/914,039

(22) PCT Filed: Sep. 19, 2013

(86) PCT No.: PCT/JP2013/075343
§ 371 (c)(1),
(2) Date: Feb. 24, 2016

(87) PCT Pub. No.: WO2015/040722
PCT Pub. Date: Mar. 26, 2015

(65) Prior Publication Data
US 2016/0211678 A1  Jul. 21, 2016

(51) Int. Cl.
*H02J 7/00* (2006.01)
*H02J 5/00* (2016.01)
(Continued)

(52) U.S. Cl.
CPC .............. *H02J 7/0021* (2013.01); *H02J 3/32* (2013.01); *H02J 5/00* (2013.01); *H02J 7/007* (2013.01); *H02J 7/0026* (2013.01); *H02J 7/02* (2013.01)

(58) Field of Classification Search
CPC ........................................................ H02J 7/00
(Continued)

(56) References Cited

U.S. PATENT DOCUMENTS

2010/0280697 A1   11/2010   Yanagisawa et al.
2012/0286739 A1*  11/2012   O'Brien, Jr. ........ H01M 2/1077
                                                             320/134
(Continued)

FOREIGN PATENT DOCUMENTS

CN    101714647 A    5/2010
JP    2000-195558 A  7/2000
(Continued)

OTHER PUBLICATIONS

Combined Chinese Office Action and Search Report issued Aug. 21, 2017 in Patent Application No. 201380079690.8 (with English language translation and English translation of categories of cited documents).

(Continued)

*Primary Examiner* — Mohammed Alam
(74) *Attorney, Agent, or Firm* — Oblon, McClelland, Maier & Neustadt, L.L.P.

(57) ABSTRACT

A storage battery system connected to a power system and operative based on a charge/discharge request from an EMS includes: a battery management unit configured to monitor a state of a storage battery including plural cells; a power conditioning system; a controller configured to receive the charge/discharge request and storage battery information from the battery management unit and control the power conditioning system based thereon; a sleep controller configured to receive the storage battery information and execute sleep control to output a charge/discharge command to the power conditioning system so that an average voltage of plural cells is maintained within a voltage range that suppresses deterioration of the storage battery. The sleep controller includes a sleep control stop function stopping the sleep control when a voltage of any of the plural cells in the
(Continued)

storage battery information is out of an allowable voltage range including the holding voltage range.

7 Claims, 3 Drawing Sheets

(51) Int. Cl.
*H02J 3/32* (2006.01)
*H02J 7/02* (2016.01)
(58) Field of Classification Search
USPC .......................................................... 320/116
See application file for complete search history.

(56) References Cited

U.S. PATENT DOCUMENTS

| | | | | |
|---|---|---|---|---|
| 2014/0266062 A1* | 9/2014 | Lee | ....................... | H01M 10/44 320/134 |
| 2015/0054467 A1* | 2/2015 | Takano | ................. | H01M 10/48 320/136 |
| 2015/0318725 A1* | 11/2015 | Brockman | ............ | H02J 7/0047 340/636.1 |

FOREIGN PATENT DOCUMENTS

| | | |
|---|---|---|
| JP | 2012-75243 A | 4/2012 |
| JP | 2012-175864 A | 9/2012 |
| JP | 2013-27210 A | 2/2013 |
| JP | 2013-169068 A | 8/2013 |
| WO | 2009/084673 A1 | 7/2009 |

OTHER PUBLICATIONS

International Search Report dated Dec. 24, 2013 for PCT/JP2013/075343 filed on Sep. 19, 2013.

* cited by examiner

STORAGE BATTERY SYSTEM

TECHNICAL FIELD

The present invention relates to a storage battery system connected to a power system.

BACKGROUND ART

A power system is constructed by connecting a power generation facility and a load facility through a power transmission facility. There are power systems of various scales, ranging from large-scale systems that connect a plurality of large-scale power plants with a large number of plants, commercial establishments and households to small-scale systems constructed in specific facilities. The power systems of all the scales include an energy management system (EMS) that manages electric power supply/demand in the entire power system. The EMS balances electric power supply from the power generation facilities and electric power demand from the load facilities.

A storage battery system is connected to the power system as described above to be used as one means for balancing electric power supply/demand. Although a large amount of electric power was once thought hard to store, mass storage batteries like lithium ion batteries and sodium sulfur batteries, which are now in practical use, make it possible to store a large amount of electric power. By connecting the storage battery system including such storage batteries to the electric power system, it becomes possible to adopt such an operation as to charge the storage batteries with electric power excessively generated when electric power supply exceeds electric power demand and to discharge electric power from the storage batteries to compensate shortage of electric power caused when electric power demand exceeds electric power supply.

One adequate application example of such a storage battery system is a combination of the storage battery system with a power generation facility using energy of nature, such as sunlight and wind force. The power generation facilities using the energy of nature are widely being introduced in response to increased interest in energy issues or environmental issues of these days. However, the power generation facilities using the energy of nature have a disadvantage that natural factors, such as seasons and weather, tend to affect electric power to be generated and hinder stable supply of electric power. The storage battery system can make up for the disadvantage, so that stable electric power supply can be achieved by combining the storage battery system with the power generation facilities using the energy of nature.

When the storage battery system is connected to the power system, the operation of the storage battery system is managed by the above-mentioned EMS. The storage battery system includes a power conditioning system (PCS) connected to the storage battery. The PCS has a function of converting AC power of the power system into DC power and charging the storage battery with the DC power, and a function of converting DC power of the storage battery into AC power and discharging the AC power to the power system. When a charge/discharge request is supplied from the EMS to the PCS, the PCS operates in response to the charge/discharge request. As a result, charge of the storage battery with electric power from the power system or discharge of electric power from the storage battery to the power system is achieved.

The applicant of the present invention recognizes the following literature as related art of the present invention. FIG. 9 in Patent Literature 1 illustrates one example of a storage battery system connected to the power system.

CITATION LIST

Patent Literature

Patent Literature 1: Japanese Patent Laid-Open No. 2013-27210
Patent Literature 2: Japanese Patent Laid-Open No. 2012-75243

SUMMARY OF INVENTION

Technical Problem

The charge/discharge request supplied from the EMS to the PCS is determined so as to balance electric power supply/demand in the entire power system. However, the determination is not necessarily adequate for the storage battery. Since the EMS executes a huge amount of arithmetic calculation, it is difficult for the EMS to constantly grasp the state of the storage battery which is a recipient of the request and to perform finely-tuned control corresponding to the state. When the storage battery system has a large capacity in particular, the storage battery is constituted of a large number of cells. In a specific example, the storage battery is constituted of hundreds of cells to tens of thousands of cells. Accordingly, it is quite difficult to constantly grasp the states of all these cells.

By the way, the life of the storage battery changes with holding voltage. Sleep control is known as control to suppress deterioration of the storage battery by maintaining the voltage of the storage battery within an adequate range of the holding voltage while the storage battery is out of use. In the case where the EMS manages the sleep control, it is difficult for the EMS to constantly grasp the state of all the cells and to perform finely-tuned control as described before. Accordingly, the control is performed based on the voltage of the storage battery as a whole.

However, it is difficult to individually monitor the voltages of the respective cells constituting the storage battery in conventional methods. Accordingly, a specific cell may have an abnormal voltage although an average voltage of the storage battery as a whole is within the range of the holding voltage. In such a case, the voltage of the pertinent cell is not maintained in the holding voltage range, and so the sleep control performed in this state may contrary cause accelerated deterioration of the pertinent cell.

The present invention has been made in view of the above-mentioned problem, and it is therefore an object of the present invention to provide a storage battery system capable of suppressing deterioration of a plurality of cells constituting a storage battery.

Solution to Problem

In order to accomplish the above object, a storage battery system according to the present invention is configured as described below.

The storage battery system according to the present invention is connected to a power system and is configured to operate based on a charge/discharge request from an energy management system that manages electric power supply/demand of the power system. There is no limitation on the scale and configuration of the power system to be connected to the storage battery system according to the present invention.

The storage battery system according to the present invention includes a storage battery, a battery management unit, a power conditioning system, and a control device. The storage battery is constituted as an assembly of a plurality of cells. As for the type of storage battery, a mass storage battery such as a lithium ion battery, a sodium sulfur battery, and a nickel-hydrogen battery is preferable.

The battery management unit is configured to monitor the state of the storage battery on a constant basis or at a specified cycle. The battery management unit monitors the state quantity of monitoring items such as current, voltage, and temperature. As for the voltage, the voltages of the respective cells are individually monitored. The battery management unit measures the state quantity of the monitoring items with sensors on a constant basis or at a specified cycle, and outputs some or all of the obtained data to the outside as storage battery information.

The power conditioning system is configured to connect the storage battery to the power system. The power conditioning system has a function of converting AC power of the power system into DC power and charging the storage battery with the DC power and a function of converting DC power of the storage battery into AC power and discharging the AC power to the power system. The power conditioning system is also called a power conditioner, which regulates the amount of electric power for charging the storage battery and the amount of electric power discharged from the storage battery.

The control device is a device interposed between the energy management system and the power conditioning system. The control device receives the charge/discharge request supplied from the energy management system to the storage battery system. The control device is configured to receive, together with the charge/discharge request, the storage battery information supplied from the battery management unit and to control the power conditioning system based on the charge/discharge request and the storage battery information.

The control device includes a sleep control unit. The sleep control unit is configured to receive the storage battery information and to execute sleep control to output a charge/discharge command to the power conditioning system so that an average voltage of the respective cells is maintained within the range of the holding voltage that suppresses deterioration of the storage battery. The holding voltage is the voltage which can suppress deterioration of the storage battery most and which is different for each of storage battery types. The holding voltage range is a preset range around the holding voltage, which is adequate for suppressing deterioration of the storage battery.

The sleep control unit outputs a charge/discharge command to the power conditioning system so that an average voltage of the plurality of cells included in the storage battery information is maintained within the range of the holding voltage that suppresses deterioration of the storage battery. The sleep control unit further includes a sleep control stop function for stopping the sleep control when the voltage of any one of the plurality of cells included in the storage battery information is out of an allowable voltage range including the holding voltage range. An upper limit of the allowable voltage range is set smaller than an interlock threshold used for determining overcharge of the storage battery. A lower limit of the allowable voltage range is set higher than an interlock threshold used for determining overdischarge of the storage battery.

In another preferable aspect of the storage battery system according to the present invention, the sleep control unit is configured to prestore a utilization schedule of the storage battery system utilized by the power system and to execute the sleep control based on the schedule. The schedule can be created in advance based on a past electric power supply/demand history of the power system. For example, the schedule includes a plan of executing sleep control in a time period when the electric power demand of the load facility balances with the electric power supply of the power generation facility.

Furthermore, the schedule preferably includes a peak cut period set for the storage battery system to be used for peak cut of the power system and a preparation period set before the peak cut period. In addition, the sleep control unit preferably includes a peak cut preparation function for terminating the sleep control in the preparation period to increase the voltage of the storage battery. It is to be noted that the peak cut period and the preparation period are not included in the time period when the aforementioned sleep control is executed.

In another preferable aspect of the storage battery system according to the present invention, the control device may further include an interlock processing unit. The interlock processing unit is configured to perform interlock processing upon detection of abnormality of the storage battery system, the interlock processing corresponding to a content of the detected abnormality. The abnormality of the storage battery system is detectable, for example, from the storage battery information supplied from the battery management unit. In detection of the abnormality of the storage battery system, it is, of course, possible to refer to information other than the storage battery information, such as information from the power conditioning system.

Advantageous Effects of Invention

According to the storage battery system in the present invention, when the voltage of one of the plurality of cells constituting the storage battery is out of the allowable voltage range while the sleep control is executed for the storage battery, the sleep control is stopped. Accordingly, the storage battery system according to the present invention can suppress deterioration of the cells. Moreover, it becomes possible to stop charge/discharge of the storage battery and prevent occurrence of major faults before the voltages of the cells become abnormal.

DESCRIPTION OF EMBODIMENT

Hereinafter, an embodiment of the present invention will be described in detail with reference to the drawings. It is to be noted that like component members are designated by like reference signs to omit redundant description.

First Embodiment

[Overall Configuration of First Embodiment]

Figure 1:
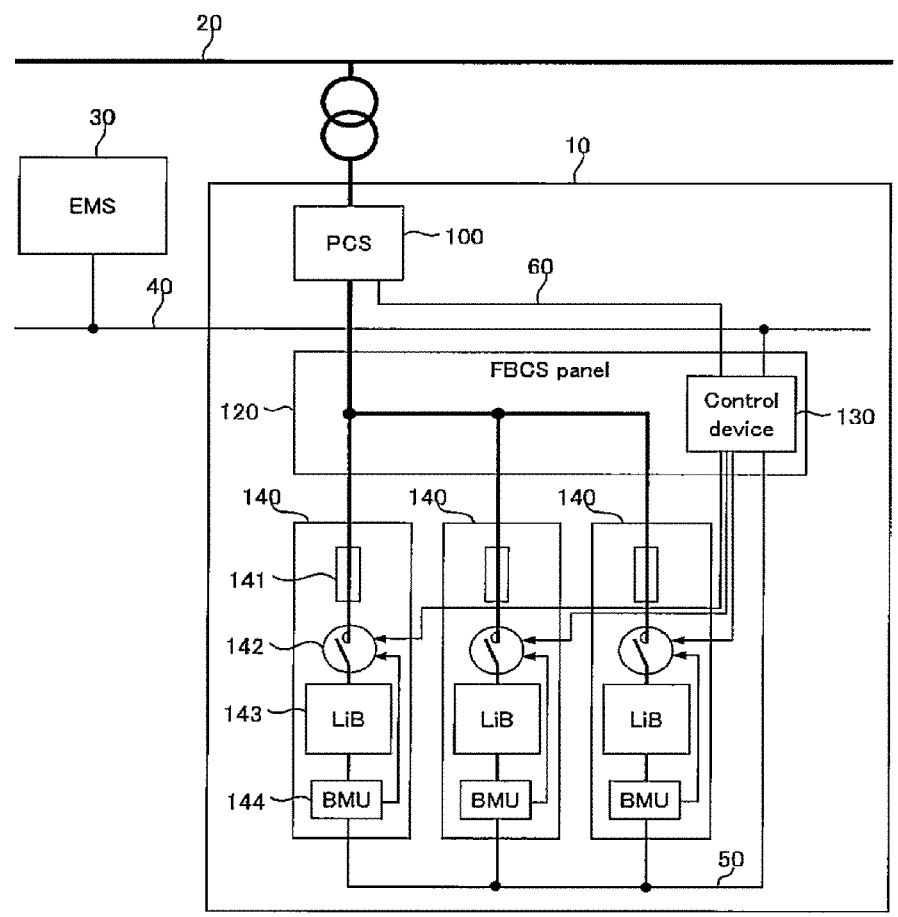
FIG. 1 is a conceptual block diagram for describing the system configuration according to a first embodiment of the present invention.

FIG. 1 is a conceptual block diagram for describing the system configuration according to a first embodiment of the present invention. A storage battery system 10 illustrated in FIG. 1 is connected to a power transmission facility 20 of a power system. The power system includes, in addition to the power transmission facility 20, a power generation facility (illustration omitted) connected to the power transmission facility 20, and a load facility (illustration omitted) connected to the power transmission facility 20. The storage battery system 10 is connected to an energy management system (hereinafter referred to as EMS) 30 present in the distant through a computer network 40. The EMS 30 manages electric power supply/demand of the power system, such as the power generation amount of the power generation facility, the charge/discharge amount of the storage battery system 10, and the power reception amount of the load facility.

The storage battery system 10 includes a power conditioning system (hereinafter referred to as PCS) 100, a front battery control station panel (hereinafter referred to as FBCS panel) 120, and storage battery panels 140. In the storage battery system 10, one PCS 100 is connected to one FBCS panel 120, and the one FBCS panel 120 is connected a plurality of storage battery panels 140 in parallel. Although three rows of storage battery panels 140 are provided in FIG. 1, this configuration is merely an example. The number of the storage battery panels 140 arranged in parallel is determined based on the specification of the PCS 100. Therefore, only one storage battery panel 140 may be provided in parallel. Although the storage battery system 10 has one PCS 100 in FIG. 1, this configuration is also merely an example. The number of the PCSs 100 arranged in parallel is determined based on the specification of the storage battery system 10. Therefore, the number of the PCSs 100 in parallel may be two or more.

(Storage Battery Panel)

The storage battery panel 140 includes a fuse 141, a contactor 142, a storage battery module 143, and a battery management unit (hereinafter referred to as BMU 144). The storage battery module 143 is a module constituted of a plurality of cells connected in series. Each cell is a lithium ion battery (LiB). The storage battery module 143 is connected to the FBCS panel 120 via the contactor 142 and the fuse 141 and through a power transmission line. The storage battery module 143 is also connected to the BMU 144 through a signal line. The BMU 144 is connected to the control device 130 on the FBCS panel 120 through a computer network 50, and to the contactor 142 through the signal line.

The BMU 144 monitors the state of the storage battery module 143. Specifically, the BMU 144 includes a current sensor (illustration omitted), a voltage sensor (illustration omitted), and a temperature sensor (illustration omitted) as means for measuring the state quantities of the storage battery module 143. The current sensor measures current passing through the storage battery module 143. The voltage sensor is provided for each cell to measure the voltage of each cell. The temperature sensor measures the temperature of the storage battery module 143. These sensors do not necessarily have to be provided inside the casing of the BMU 144. These sensors attached to the storage battery module 143 and the BMU 144 may be connected through the signal line. The storage battery module 143 is constantly monitored by the BMU 144. However, the constant monitoring described in the present embodiment is a concept including not only the operation of taking in continuous signals without an intermission from the sensors but also the operation of taking in the signals of the sensors at a specified short cycle. The BMU 144 transmits to the control device 130 storage battery information including the information obtained by measurement performed by each sensor.

The contactor 142 is disposed between the fuse 141 and the storage battery module 143. Upon reception of an ON signal, a point of contact of the contactor 142 is set to ON and so the contactor 142 is turned on. Upon reception of an OFF signal, the point of contact is set to OFF and so the contactor 142 is turned off. For example, the ON signal is a current of more than a specified value [A], and the OFF signal is a current of less than the specified value [A]. When the contactor 142 is turned on, the PCS 100 and the storage battery module 143 are electrically connected, and when the contactor 142 is turned off, the PCS 100 and the storage battery module 143 are electrically disconnected.

(FBCS Panel)

The FBCS panel 120 is connected to the storage battery panels 140 and the PCS 100. Specifically, the storage battery panels 140 are each connected to the FBCS panel 120 through individual power transmission lines. The individual power transmission lines converge inside the FBCS panel and are connected to a thicker power transmission line. The converged power transmission line is connected to the PCS 100. The FBCS panel 120 also includes the control device 130. The control device 130 includes memories including a ROM and a RAM for example, an input/output interface for inputting and outputting a variety of information, and a processor that can execute various arithmetic processes based on the variety of information. The control device 130 is connected to the EMS 30 through the computer network 40, to the BMU 144 through the computer network 50, and to the PCS 100 through a computer network 60. The control device 130 is connected to the contactor 142 through the signal line.

The control device 130 plays the role of a commander that issues a charge/discharge command to the PCS 100. In one example, the control device 130 receives a charge/discharge request transmitted from the EMS 30 and storage battery information transmitted from the BMU 144. The charge/discharge request includes a request with respect to active power and reactive power charged and discharged by the PCS 100. The charge/discharge request includes a specific request numerically indicating a specific electric power amount, and an abstract request requesting maximum charge/discharge power. The control device 130 determines a charge/discharge command (equivalent to a charge/discharge amount [kW]) to be issued to the PCS 100 based on the charge/discharge request and the storage battery information, and transmits the command to the PCS 100. The control device 130 also includes functions such as a function of safely controlling the performance and life of the storage battery module 143 to the maximum, a function of outputting a trip signal to the PCS 100, and a function of turning on and off the contactor 142.

(PCS)

The PCS 100 is connected to the power transmission facility 20 via a transformer and through the power transmission line. The PCS 100 has a charging function of converting AC power of the power system into DC power and charging the storage battery module 143 with the DC power, and a discharging function of converting DC power of the storage battery module 143 into AC power and discharging the AC power to the power system. The amount of electric power to charge the storage battery module 143 and the amount of electric power discharged from the storage battery module 143 are adjusted by the PCS 100. Regulation of the charge/discharge electric power amount by the PCS 100 is performed in accordance with the charge/discharge command supplied from the control device 130. The PCS 100 includes a current sensor (illustration omitted) and a voltage sensor (illustration omitted), and the PCS 100 adjusts the charge/discharge electric power amount with reference to the output values of these sensors.

[Characteristic Configuration of First Embodiment]

Figure 2:
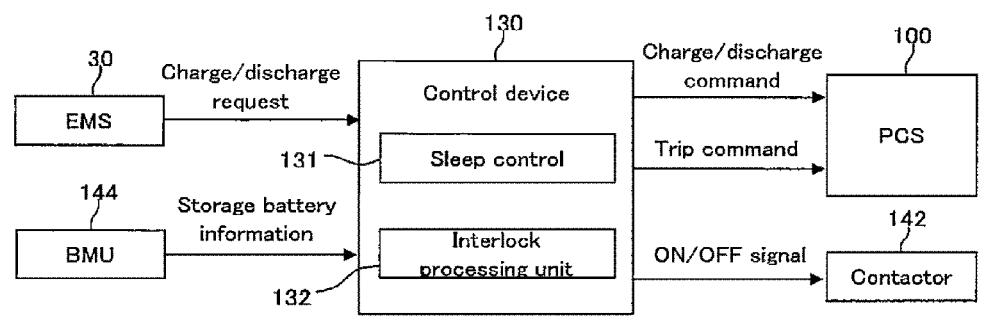
FIG. 2 is a block diagram of the system according to the first embodiment of the present invention.

FIG. 2 is a block diagram of the system according to the first embodiment of the present invention. In FIG. 2, a block representing the control device 130 contains blocks representing some of various functions included in the control device 130. An arithmetic resource is assigned to each of these blocks. Programs corresponding to the respective blocks are prepared for the control device 130, and these programs are executed by the processor, so that the functions of the respective blocks are implemented in the control device 130.

The control device 130 receives a charge/discharge request from the EMS 30, and receives storage battery information from the BMU 144. The control device 130 determines a charge/discharge command based on the charge/discharge request and the storage battery information, and transmits the charge/discharge command to the PCS 100.

(Sleep Control Function)

The control device 130 has a sleep control function, which is implemented by a sleep control unit 131. The sleep control unit 131 executes sleep mode operation for maintaining the cell voltages in a specified holding voltage range in order to prevent the storage battery module 143 from being left and deteriorated in the case where charge/discharge is not performed for a while. For example, the sleep control unit 131 executes sleep control, when a sleep mode operation command is issued from the EMS 30 or from an operating device connected to the FBCS panel. The holding voltage range is 3.8 [V]±a few hundred [mV].

The sleep control will be described in detail. The control device 130 outputs an electric discharge command to the PCS 100, when an average voltage (cell average voltage) of all the cells constituting the storage battery module 143 is higher than the upper limit of the holding voltage range. When the cell average voltage is within the range from the upper limit to the lower limit of the holding voltage range, the charge/discharge command to the PCS 100 is set to 0, and natural discharge is permitted. When the cell average voltage is lower than the lower limit of the holding voltage range, the charge command is output to the PCS 100. Such sleep control maintains the cell average voltage within the range of the holding voltage range.

(Sleep Control Stop Function)

In addition, the control device 130 has a sleep control stop function, which is implemented by the sleep control unit 131. When a specific cell has abnormality, the voltage of the specific cell may be higher or lower than the holding voltage range although the cell average voltage is within the holding voltage range. If sleep control is continued in such a state, not only deterioration of the storage battery module 143 cannot be suppressed, but also deterioration of the specific cell may be accelerated.

Accordingly, the sleep control unit 131 stops the sleep control, when the voltage of any one of the cells in the storage battery modules 143 is out of the allowable voltage range. The allowable voltage range includes the holding voltage range. Accordingly, the upper limit of the allowable voltage range is set higher than the upper limit of the holding voltage range, and the lower limit of the allowable voltage range is set lower than the lower limit of the holding voltage range.

It is to be noted that the sleep control stop processing is different in purpose and determination criteria from the interlock processing. The sleep control stop processing is preventive control to prevent occurrence of major faults, which may trigger the interlock processing, by stopping charge/discharge of the PCS 100 before occurrence of the major faults. Accordingly, the upper limit of the allowable voltage range is lower than the upper limit threshold (for example, a threshold representative of overcharge) used for determining the interlock processing, and the lower limit of the allowable voltage range is set higher than a lower limit threshold (for example, a threshold representative overdischarge) used for determining the interlock processing.

(Sleep Control Schedule Function)

The control device 130 has a sleep control schedule function, which is implemented by the sleep control unit 131. The sleep control unit 131 prestores a utilization schedule of the storage battery system 10 utilized by the power system, and executes the sleep control based on the schedule. The schedule can be created in advance based on a past electric power supply/demand history of the power system.

Figure 3:
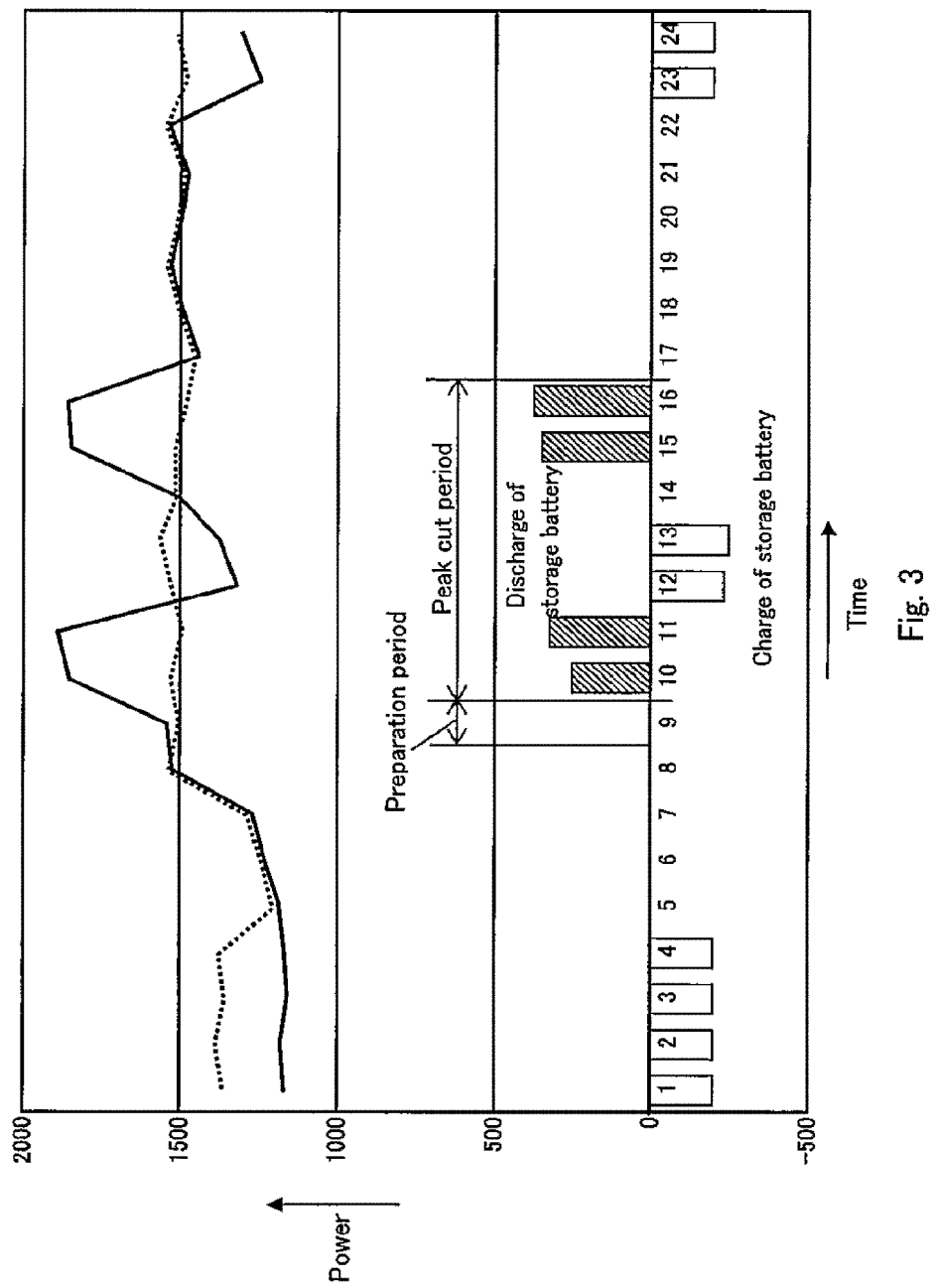
FIG. 3 is an explanatory view illustrating one example of the schedule used by the storage battery system in the first embodiment of the present invention.

For example, a peak cut period, a peak cut preparation period, and a sleep control period are set in the schedule. FIG. 3 is an explanatory view illustrating one example of the schedule used by the storage battery system in the first embodiment of the present invention. The peak cut period is a time period when the storage battery system 10 is used for peak cut of the power system. In FIG. 3, the peak cut period is a time period from 10:00 to 17:00. The peak cut preparation period is a time period for increasing the voltage as a preparation for electric power supply in the next peak cut period. In FIG. 3, the peak cut preparation period is a time period from 9:00 to 10:00. The sleep control period is a time period when the electric power demand of the load facility balances with the electric power supply of the power generation facility (the charge/discharge amount of the storage battery is 0). It is a time period excluding the peak cut period and the peak cut preparation period. In FIG. 3, the sleep control period is a time period of 5:00 to 9:00 and a time period of 17:00 to 23:00.

The sleep control unit 131 executes sleep control in the sleep control period. Preferably, the sleep control unit includes a peak cut preparation function for terminating the sleep control in the peak cut preparation period to increase the voltage of the storage battery.

(Interlock Function)

The control device 130 also has an interlock function, which is implemented by the interlock processing unit 132. Interlocking of the storage battery module 143 is performed also by the BMU 144 when the BMU 144 detects overdischarge, overcharge, abnormal temperature, and the like. However, by the time when such abnormality occurs, the storage battery is already in a considerably overloaded state. Accordingly, in the system of the present embodiment, the PCS 100 and the contactor 142 are controlled by a software interlock mechanism before the BMU 144 interlocks the module 143. The interlock processing unit 132 performs interlock processing upon detection of abnormality of the storage battery system 10, the interlock processing corresponding to a content of the detected abnormality. Specifically, the interlock processing refers to the processing of outputting a trip signal to the PCS 100 and/or turning on the contactor 142. In order to execute the interlock processing before the BMU 144 performs the interlock processing, interlock threshold values, such as current, voltage, and temperature, are set lower than the threshold values set by the BMU 144.

(Flow Chart)

Figure 4:
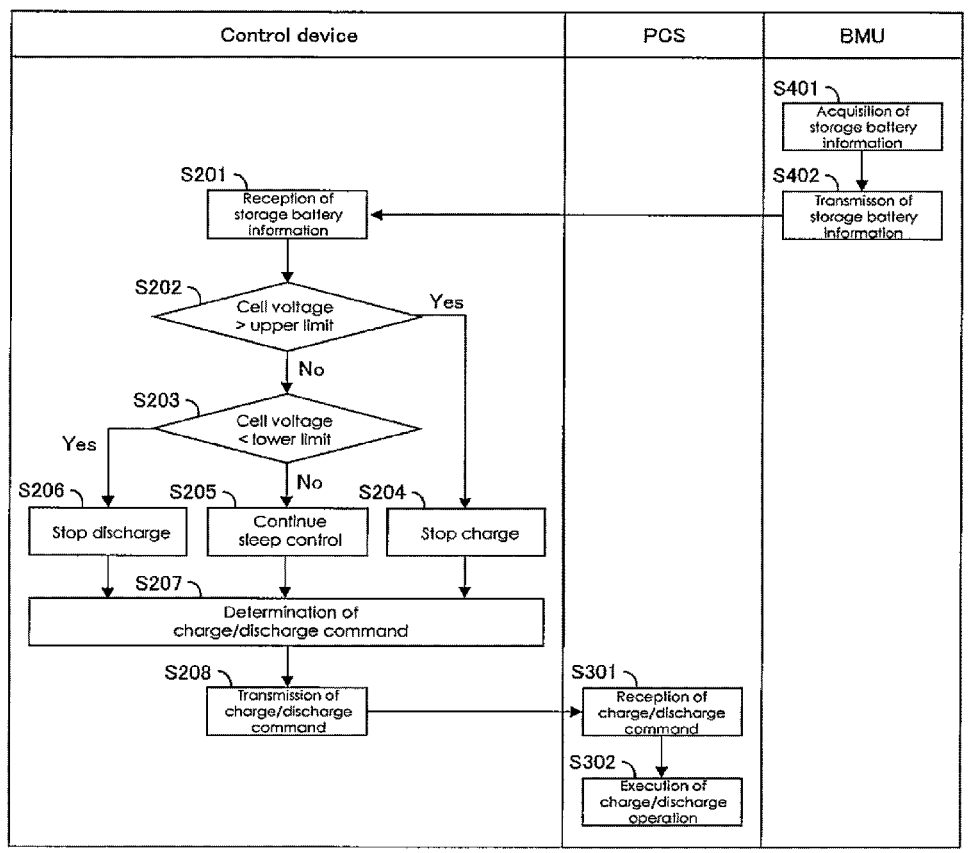
FIG. 4 is a flow chart of a control routine executed by the storage battery system to implement the sleep control stop function in the first embodiment of the present invention.

FIG. 4 is a flow chart of a control routine executed by the storage battery system 10 to implement the sleep control stop function in the first embodiment of the present invention. Processing of the control device 130 illustrated in this flow chart is implemented by the function of the sleep control unit 131. The memory of the control device 130 stores programs for executing the processing of the flow chart illustrated in FIG. 4. When the processor of the control device 130 reads and executes the programs, the processing illustrated in FIG. 4 is implemented.

As a prerequisite of execution of the routine illustrated in FIG. 4, the sleep control is in execution in another routine. The details of the sleep control are as disclosed in the description of the sleep control function.

In the routine illustrated in FIG. 4, the BMU 144 first acquires storage battery information on the constant basis by using the various sensors described before (step S401). The storage battery information includes the current passing through the storage battery module 143, the voltage of each cell, and the temperature of the storage battery module 143. Then, the BMU 144 transmits the acquired storage battery information to the control device 130 (step S402).

The control device 130 receives the storage battery information transmitted from the BMU 144 (step S201). It is to be noted that each of the following processes performed by the control device 130 is executed depending on the number of cells, whenever the storage battery information is received.

The control device 130 determines whether or not the voltage (cell voltage) of each of the plurality of cells constituting the storage battery module 143 is higher than the upper limit of the allowable voltage range (step S202). As stated above, the allowable voltage range includes the holding voltage range. If the cell voltage of any one of the cells is higher than the upper limit, the control device 130 determines to stop electric charge and to stop the sleep control of the storage battery module 143 (step S204). The processing of step S204 is preferentially executed even when the cell average voltage of the storage battery module 143 is within the holding voltage range. The control device 130 determines a charge/discharge command to stop electric charge and to also stop the sleep control (step S207). The 130 transmits the determined charge/discharge command to the PCS 100 (step S208). The PCS 100 receives the charge/discharge command transmitted from the control device 130 (step S301). The PCS 100 executes charge/discharge operation in accordance with the charge/discharge command (step S302). Specifically, the PCS 100 stops electric charge and stops sleep control.

In step S202, when the cell voltage is equal to or below the upper limit, it is determined whether or not the cell voltage is lower than the lower limit of the allowable voltage range (step S203). If the cell voltage of any one of the cells is lower than the lower limit, the control device 130 determines to stop electric discharge and to stop the sleep control of the storage battery module 143 (step S206). The processing of step S206 is preferentially executed even when the cell average voltage of the storage battery module 143 is within the holding voltage range. The control device 130 determines a charge/discharge command to stop electric discharge and to also stop the sleep control (step S207). The control device 130 transmits the determined charge/discharge command to the PCS 100 (step S208). The PCS 100 receives the charge/discharge command transmitted from the control device 130 (step S301). The PCS 100 executes charge/discharge operation in accordance with the charge/discharge command (step S302). Specifically, the PCS 100 stops electric discharge and stops sleep control.

If the cell voltage is equal to or above the lower t in step S203, the cell voltage is within the allowable voltage range, and so the control device determines to continue the sleep control (step S205). The control device determines a charge/discharge command for the sleep control (step S207). The control device 130 transmits the determined charge/discharge command to the PCS 100 (step S208). The PCS 100 receives the charge/discharge command transmitted from the control device 130 (step S301). The PCS 100 executes charge/discharge operation in accordance with the charge/discharge command (step S302).

As described in the foregoing, the storage battery system 10 of the present embodiment stops the sleep control, when the cell voltage of any one of the plurality of cells constituting the storage battery module 143 is out of the allowable voltage range during the sleep control of the storage battery module 143. Accordingly, the storage battery system according to the present invention can suppress deterioration of the cells. The storage battery system according to the present invention can also prevent occurrence of major faults of the storage battery module 143 by stopping charge/discharge before the cell voltages become abnormal voltages.

Moreover, in the storage battery system 10 of the present embodiment, the peak cut preparation period is provided between the sleep control period and the peak cut period. Accordingly, deterioration of the storage battery can be suppressed before the peak cut preparation period. Providing the peak cut preparation period enables the storage battery system 10 to prepare for the peak cut period.

Although the control device 130 is placed on the FBCS panel 120 in the system of the first embodiment described in the foregoing, the placement position of the control device 130 is not limited thereto. For example, the control device 130 may be placed in the PCS 100, the storage battery panel 140, or in any one of the BMUs 144. Moreover, various functions mounted on the control device 130 may be mounted on the PCS 100, and be installed in the PCS 100. These various functions may also be installed in the storage battery panel 140 and on the BMUs 144.

REFERENCE SIGNS LIST

10 Storage battery system
20 power transmission facility
30 Energy management system (EMS)
40, 50, 60 Computer network
100 Power conditioning system (PCS)
120 FBCS panel
130 Control device
131 Sleep control unit
132 Interlock processing unit
140 Storage battery panel
141 Fuse
142 Contactor
143 Storage battery module
144 Battery management unit (BMU)

The invention claimed is:

1. A storage battery system connected to a power system and operative based on a charge/discharge request from an energy management system that manages electric power supply/demand of the power system, the storage battery system comprising:
   a storage battery including a plurality of cells connected in series;
   battery management circuitry configured to continuously monitor a state of the storage battery;
   power conditioning circuitry configured to
      convert AC power of the power system into DC power;
      charge the storage battery with the DC power;
      convert DC power of the storage battery into AC power; and
      discharge the AC power to the power system; and
   a controller configured to
      receive the charge/discharge request and storage battery information supplied from the battery management circuitry; and
      control the power conditioning circuitry based on the charge/discharge request and the storage battery information, wherein
   the controller is configured to
      receive the storage battery information and execute control to output a charge/discharge command to the power conditioning circuitry so that an average voltage of the plurality of cells is maintained within a range of a holding voltage that suppresses deterioration of the storage battery; and
      stop the executing the control when a voltage of any one of the plurality of cells included in the storage battery information is out of an allowable voltage range including the holding voltage range.

2. The storage battery system according to claim 1, wherein
   the controller is configured to perform interlock processing upon detection of abnormality of the storage battery system, the interlock processing corresponding to a content of the detected abnormality.

3. The storage battery system according to claim 2, wherein
   the controller is configured to detect abnormality of the storage battery system based on the storage battery information.

4. The storage battery system according to claim 1, wherein the controller is configured to:
   prestore a utilization schedule of the storage battery system utilized by the power system; and
   execute the control based on the schedule.

5. The storage battery system according to claim 1, wherein
   the schedule includes a peak cut period set for the storage battery system to be used for peak cut of the power system and a preparation period set before the peak cut period, and
   the controller includes a peak cut preparation function for terminating the sleep control in the preparation period to increase a voltage of the storage battery.

6. A storage battery system connected to a power system and operative based on a charge/discharge request from an energy management system that manages electric power supply/demand of the power system, the storage battery system comprising:
   a storage battery including a plurality of cells connected in series;
   battery management circuitry configured to continuously monitor a state of the storage battery;
   power conditioning circuitry configured to
      convert AC power of the power system into DC power;
      charge the storage battery with the DC power;
      convert DC power of the storage battery into AC power; and
      discharge the AC power to the power system; and
   a controller configured to
      receive the charge/discharge request and storage battery information supplied from the battery management circuitry; and
      control the power conditioning circuitry based on the charge/discharge request and the storage battery information, wherein
   the controller is configured to
      receive the storage battery information and execute control to output a charge/discharge command to the power conditioning circuitry so that an average voltage of the plurality of cells is maintained within a range of a holding voltage that suppresses deterioration of the storage battery;
      stop executing the controlling when a voltage of any one of the plurality of cells included in the storage battery information is out of an allowable voltage range including the holding voltage range; and
      perform interlock processing upon detection of abnormality of the storage battery system based on the storage battery information, the interlock processing corresponding to a content of the detected abnormality.

7. A storage battery system connected to a power system and operative based on a charge/discharge request from an energy management system that manages electric power supply/demand of the power system, the storage battery system comprising:
   a storage battery including a plurality of cells connected in series;
   battery management circuitry configured to continuously monitor a state of the storage battery;
   power conditioning circuitry configured to
      convert AC power of the power system into DC power;
      charge the storage battery with the DC power;
      convert DC power of the storage battery into AC power; and
      discharge the AC power to the power system; and
   a controller configured to
      receive the charge/discharge request and storage battery information supplied from the battery management circuitry; and
      control the power conditioning circuitry based on the charge/discharge request and the storage battery information, wherein
   the controller is configured to
      receive the storage battery information and execute control to output a charge/discharge command to the power conditioning circuitry so that an average voltage of the plurality of cells is maintained within a range of a holding voltage that suppresses deterioration of the storage battery;
      stop executing the controlling when a voltage of any one of the plurality of cells included in the storage battery information is out of an allowable voltage range including the holding voltage range; and prestore a utilization schedule of the storage battery system utilized by the power system and execute the controlling based on the schedule.

* * * * *